United States Patent [19]
Francis

[11] Patent Number: 4,773,448
[45] Date of Patent: Sep. 27, 1988

[54] FREEZE-RESISTANT PLASTIC PIPE AND METHOD FOR ITS MANUFACTURE

[76] Inventor: Norman L. Francis, 4219 Thirteenth St., East Beach, St. Simons Island, Ga. 31522

[21] Appl. No.: 19,416

[22] Filed: Feb. 26, 1987

[51] Int. Cl.$^4$ .................. E03B 7/10; B29C 67/22; B29C 47/06; B29C 47/26
[52] U.S. Cl. .................. 138/28; 138/149; 138/DIG. 9; 264/45.5; 264/45.9; 264/171; 264/DIG. 14; 425/133.1; 425/817 C
[58] Field of Search .......... 264/45.9, 45.6, 45.5, 264/171, DIG. 14; 138/32, 149, 28, 177; 425/133.1, 817 C

[56] References Cited

U.S. PATENT DOCUMENTS

| | | | |
|---|---|---|---|
| 3,411,981 | 11/1968 | Thomas | 264/45.9 X |
| 3,449,477 | 6/1969 | Logomasini | 264/45.6 |
| 3,764,642 | 10/1973 | Boutillier | 264/45.5 |
| 3,874,981 | 4/1975 | Hayashi et al. | 264/45.5 X |
| 3,985,931 | 10/1976 | Blackwelder | 264/45.5 X |
| 4,054,403 | 10/1977 | Hornbeck et al. | 264/45.9 X |
| 4,322,260 | 3/1982 | Conlon | 264/45.9 X |
| 4,364,882 | 12/1982 | Doucet | 264/45.9 |
| 4,383,812 | 5/1983 | Calcagni | 264/45.9 X |

FOREIGN PATENT DOCUMENTS 2478161  9/1981  France .................. 138/32

*Primary Examiner*—Philip Anderson
*Attorney, Agent, or Firm*—Arthur G. Yeager

[57] ABSTRACT

A plastic pipe with a hard outer shell lined with an inner shell of soft resilient plastic foam with a smooth central axial passageway adapted to be a conduit for liquid. A method of manufacturing this pipe which comprises simultaneously extruding the material for the outer shell and the foamable material for the inner shell into a pipe forming die.

11 Claims, 1 Drawing Sheet

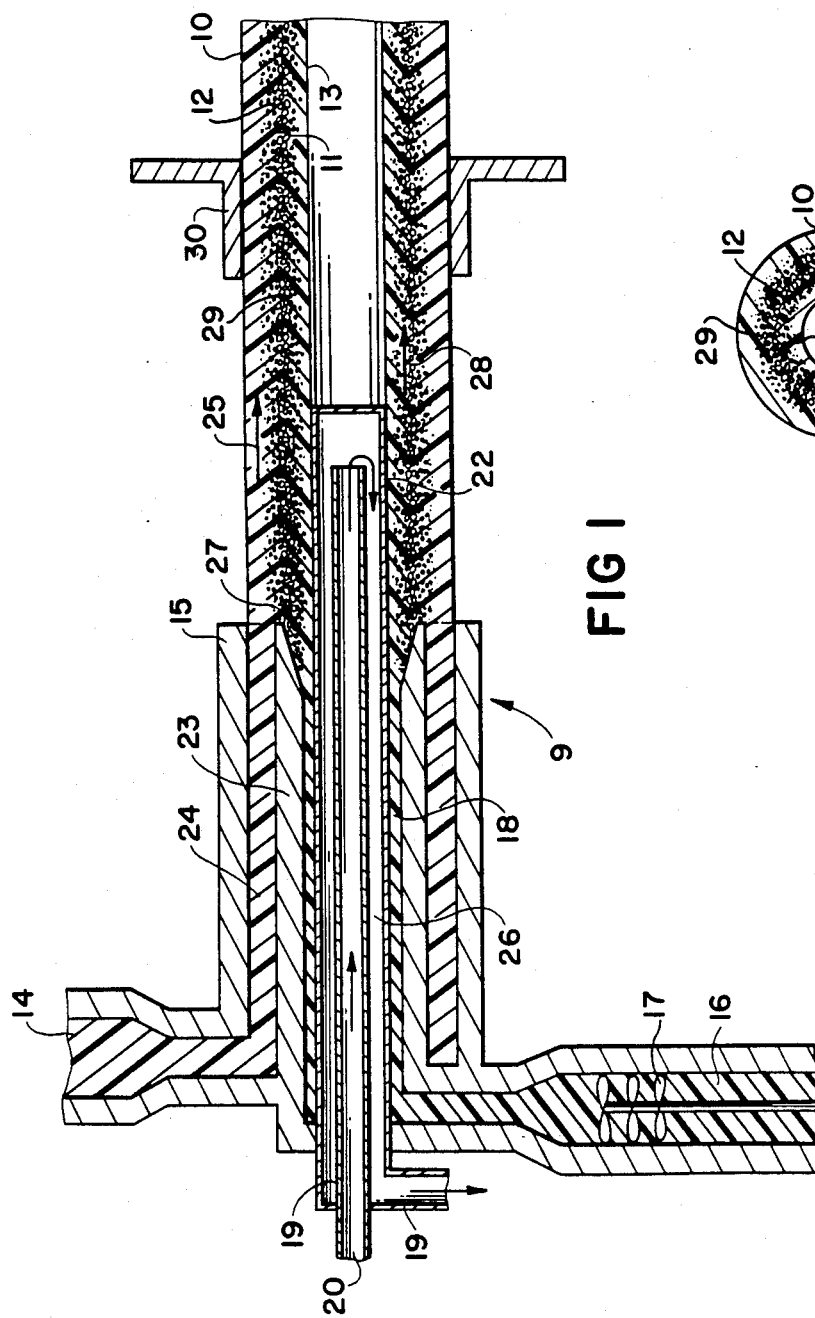
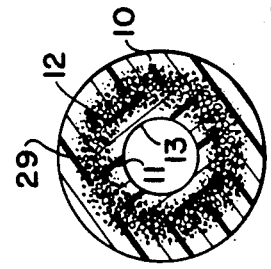
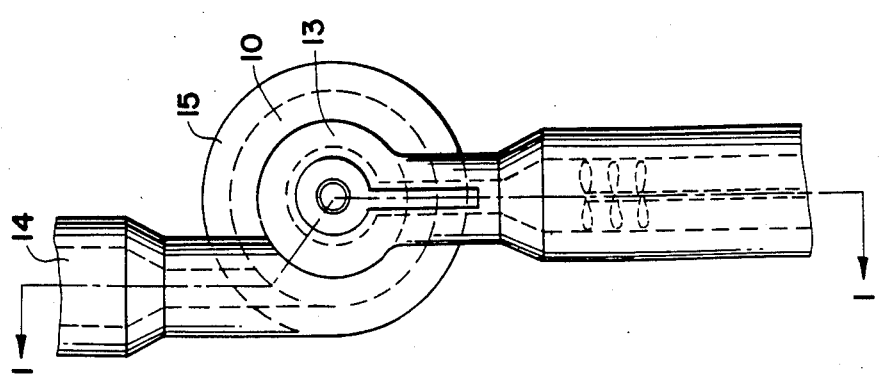

FREEZE-RESISTANT PLASTIC PIPE AND METHOD FOR ITS MANUFACTURE

BACKGROUND OF THE INVENTION

Everyone who has lived in a house located in a climatic zone which includes periods of freezing weather has had to be concerned about the possibility of water pipes freezing and bursting. Measures commonly used to prevent the freezing of water pipes include insulation of all pipes, running water continuously through the exposed pipe, and heating the pipe. None of these measures is entirely satisfactory and it has long been an engineering hope to provide a simple inexpensive pipe that would, in temperate climate zones, be able to withstand temperatures down to about 0° F. without permitting the pipe to burst due to freezing of the water inside. Since ice has a volume of about 110% of the water required to produce that ice, any freeze resistant pipe must either be strong enough to prevent the volume expansion or the pipe must be sufficiently expandable to accommodate the expansion. The availability of resilient plastic materials has provided hope of making a freeze resistant pipe, but until this invention such a pipe could not be made economically or commercially acceptable.

It is an object of this invention to provide an inexpensive freeze resistant plastic pipe. It is another object to provide a practical method for preparing such a pipe. Still other objects will become apparent from the more detailed description which follows.

BRIEF SUMMARY OF THE INVENTION

This invention relates to a pipe having a smooth rigid hard outer shell, a smooth flexible inner shell spaced inwardly from said outer shell, and a flexible closed-cell foam material filling the space between said outer and inner shells.

This invention also relates to a process for prepring a pipe having a smooth hard outer shell spaced apart from a smooth flexible inner shell separated by a foam material, said process comprising extruding a first tubular structure of polyvinyl chloride and simultaneously extruding inside of said first tubular structure, and in contact therewith, a second tubular structure of a foamed polyolefin having a smooth continuous interior cylindrical surface.

In specific embodiments of this invention the outer shell is polyvinyl chloride and the inner shell is foamed polyethylene, and the pipe is made by simultaneously coextruding foamed polyethylene tube inside an outer tube of polyvinyl chloride.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a longitudinal cross section of a coextrusion apparatus for forming the pipe of this invention as taken at 1—1 of FIG. 3;

FIG. 2 is an end view of the pipe of this invention; and

FIG. 3 is an end elevation of the coextrusion apparatus of this invention.

DETAILED DESCRIPTION OF THE INVENTION

The features of this invention can best be understood by reference to the attached drawings. In FIGS. 1 and 3 there is illustrated a coextrusion apparatus for preparing the pipe of FIG. 2. The die 9 of this apparatus is a plurality of concentric annular spaces and forming rings into which two types of molten plastic materials are caused to flow and subsequently be congealed into the finished pipe product. The outer shell 10 of the pipe is formed by pumping molten plastic from extruder exit 14 into annular space 24 between outer ring 15 and inner ring 23 and flowing to the right as indicated by arrow 25. Preferably, exit 14 approaches annular space 24 tangentially so as to provide the easiest of flow conditions for the molten plastic to fill space 24. At the same time inner shell 11 is formed by pumping a second molten plastic from a second extruder exit 16 into the annular space 18 between inner ring 23 and core 19 in the direction of arrow 28. Shells 10 and 11 are caused to move to the right at exactly the same speed and to be welded together along interface 29 to produce a unitary product. The outside of the composite pipe passes through sizing collar 30 to smooth the outside surface and to give it a precise outside diameter. The composite pipe moves to the right of sizing collar 30 into a cooling zone, e.g., a pool of water, to bring the temperatures of the plastic materials below the softening temperature to a level where the pipe will not change in size.

Preferably, the material of outer shell 10 is a strong hard material, such as polyvinyl chloride, ABS copolymer, or the like. The material of inner shell 11 is a soft foamable material such as foamed polyolefin, e.g., polyethylene. When the extruded foamable polyolefin passes beyond die exit 27, space 18 becomes larger permitting the foaming action to take place and allowing inner shell 11 to contact outer shell 10 along interface 29. The plastic material in both outer shell 10 and inner shell 11 is still somewhat molten at this point and the two materials, if compatible, will tightly adhere to each other along interface 29 to form a tight weld as the materials cool and solidify.

Core 19 is preferably a forming surface for the inside of the pipe, and also a cooling component. Water or other coolant is introduced into central pipe 20 and flows countercurrent to the movement of inner shell 11 in annular space 26 and exits at 21. Core 19 serves to cool the molten plastic in space 18 so that the inside surface 13 of the pipe will be sufficiently solidified to hold its shape while the outer surface of inner shell can expand through its foaming capability after passing die exit 27.

The product pipe is shown in FIG. 2 as having a hard outer shell 10 bonded at interface 29 to inner shell 11 at a zone of foamed plastic 12 while the inside surface 13 is smooth continuous surface having substantially no surface irregularities that would adversely affect fluid flow in the pipe. When such a pipe is filled with water and subjected to freezing conditions the water will eventually form ice causing the volume to expand about 10%. Under these conditions inner shell is expandable due to the foamed zone 12 where the foam cells are compressible. Inner surface 13 is elastic sufficiently to permit such expansion. Since the volume varies by the square of the diameter, it is apparent that a very small expansion of the diameter will cause a large change in volume.

The foam capability of the molten plastic in extruder exit 16 is accomplished by known means of incorporating a blowing agent in the plastic. Such materials are those that release a gas at elevated temperatures, such materials as azo compounds, ammonium compounds, carbonate compounds, etc. Preferably the flowing agent is a solid which is incorporated into the molten plastic at 16 and dispersed intimately throughout by means of a suitable mixing means 17. When the pressure on the molten plastic is released as at die exit 27, the blowing agent gasifies and produces foam cells along interface 29.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A pipe having a smooth, rigid hard outer shell, a smooth flexible inner shell spaced inwardly from said outer shell, and a flexible closed-cell foam material filling the space between said outer and inner shells; said flexible inner shell being sufficiently elastic to expand the internal volume of said pipe about 10% while maintaining a smooth continuous surface.

2. The pipe of claim 1 wherein said outer shell is polyvinyl chloride.

3. The pipe of claim 1 wherein said inner shell and said foam material comprises one integral structure of a polyolefin.

4. The pipe of claim 1 which is a product of coextrusion of one material for said outer shell and a second material for said foam material and said inner shell.

5. The pipe of claim 1 wherein said hard outer shell is polyvinyl chloride and bonded thereto is said smooth flexible soft plastic inner shell and filling material of foamed polyethylene, defining a core, said core having a smooth central passageway substantially free of surface irregularities adapted to conduct liquid with a minimum of frictional losses, said core being capable of compression to provide about 10% increased volume of liquid and/or solid in said passageway without substantially modifying the smoothness of said passageway.

6. A pipe consisting of a hard outer shell of polyvinyl chloride and bonded thereto a soft flexible inner core of foamed polyethylene having a smooth central passageway substantially free of surface irregularities adapted to conduct liquid with a minimum of frictional losses, said core being capable of expanding to provide about 10% increased volume in said passageway without substantially modifying the smoothness of said passageway.

7. A process for preparing a pipe having a smooth hard outer shell spaced apart from a smooth flexible elastic, expandable, continuous inner shell and separated therefrom by a mass of foam material, said process comprising extruding a first tubular structure of polyvinyl chloride and simultaneously extruding inside of said first tubular structure, and in contact therewith, a second tubular structure of a foamed polyolefin having a smooth continuous interior cylindrical hydrodynamically acceptable surface.

8. The process of claim 7 wherein said extruded polyvinyl chloride and said extended polyolefin are brought into contact with each other while both are semimolten.

9. The process of claim 8 which additionally comprises passing said semimolten structure into contact with an interior forming and solidifying core and an exterior solidifying and sizing collar to produce the finished pipe.

10. The process of claim 7 wherein said polyolefin is polyethylene.

11. The process of claim 6 which includes extruding semimolten polyvinyl chloride through a first feed conduit into a first annular elongated tubular forming space and simultaneously extruding semimolten foamable polyolefin through a second feed conduit into a second annular elongated tubular forming space positioned concentrically inside and spaced radially away from said first annular tubular space, said first feed conduit being positioned to conduct said polyvinyl chloride into said first annular space in a tangential direction with respect thereto.

* * * * *